United States Patent
Reccius et al.

[11] Patent Number: 5,971,988
[45] Date of Patent: Oct. 26, 1999

[54] DEVICE FOR CHIP REMOVING MACHINING

[75] Inventors: Helmut Reccius, Gummersbach; Gerhard Stolz, Ingersheim, both of Germany

[73] Assignee: Komet Praezisionswerkzeuge Robert Breuning GmbH, Besigheim, Germany

[21] Appl. No.: 08/930,785

[22] PCT Filed: Apr. 4, 1996

[86] PCT No.: PCT/EP96/01471

§ 371 Date: Sep. 29, 1997

§ 102(e) Date: Sep. 29, 1997

[87] PCT Pub. No.: WO96/31307

PCT Pub. Date: Oct. 10, 1996

[30] Foreign Application Priority Data

Apr. 7, 1995 [DE] Germany .................. 195 13 305

[51] Int. Cl.⁶ .................................................. A61B 17/00
[52] U.S. Cl. ................................................ 606/79; 408/11
[58] Field of Search ................... 606/79, 80, 96; 408/205, 10, 11, 14, 203.5, 204, 206, 144, 199; 407/46; 279/8; 82/158, 160

[56] References Cited

U.S. PATENT DOCUMENTS 2,835,023  8/1958  Steeves .
4,329,092  5/1982  Ponitzsch et al. .................. 408/11
4,871,286 10/1989  Hunt .

FOREIGN PATENT DOCUMENTS 508 152 A2 10/1992 European Pat. Off. .
085 354  8/1993 European Pat. Off. .
848 140  9/1952 Germany .
968 745  9/1964 United Kingdom .

*Primary Examiner*—Michael Buiz
*Assistant Examiner*—Vikki Trinh
*Attorney, Agent, or Firm*—Flynn, Thiel, Boutell & Tanis, P.C.

[57] ABSTRACT

A device for machining of workpieces or objects, comprises an elongated tool which rotates about its longitudinal axis and is provided with a shaft which can be coupled to a drive unit and with a chip-removing head connected to the shaft. In order to ensure that even a very long tool can be used in deep hollows in the workpiece in a stable and vibration-free way, a sleeve positioned between the shaft and the chip-removing head is connected at one end to the chip-removing head so that it cannot slide or rotate. The tool can be clamped in the chuck of a hand-held drive unit, preferably with a suction and flushing device connected in series, and used to suck away chips through the cavity in the sleeve and to pump cooling fluid onto the cutting site.

34 Claims, 5 Drawing Sheets

Fig. 2

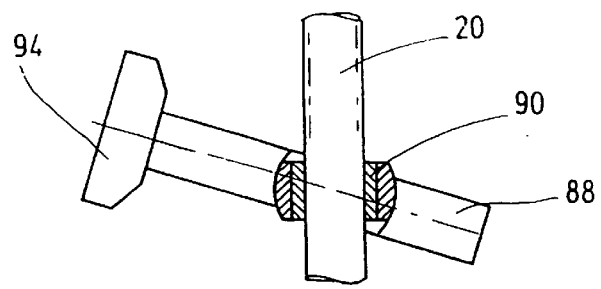
Fig. 5c
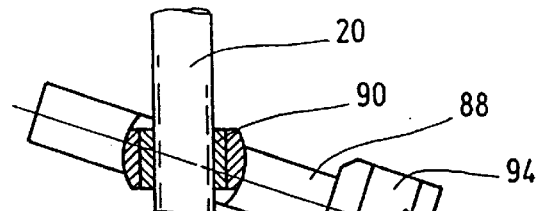
Fig. 5d
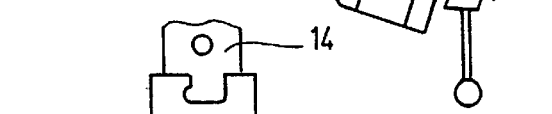
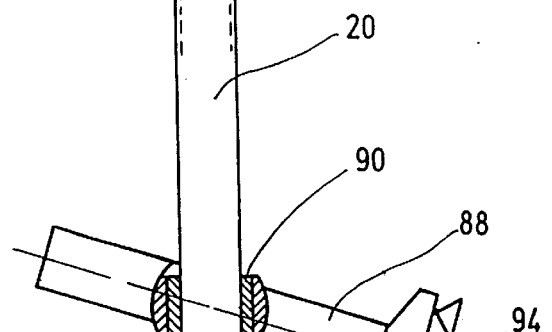
Fig. 5a
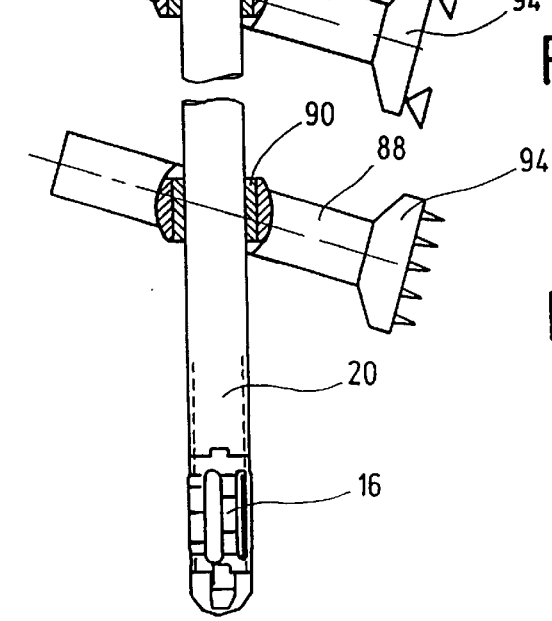
Fig. 5b

DEVICE FOR CHIP REMOVING MACHINING

FIELD OF THE INVENTION

The invention is related to a device for material removing machining of objects or work pieces, comprising an elongated tool adapted to rotate about a longitudinal axis thereof, which tool comprises a shank adapted to be coupled to a drive unit and a cutting head connected to the shank.

BACKGROUND OF THE INVENTION

When implanting and replacing bone prostheses such as hip joint prostheses, it is often necessary to work in deep recesses of the body in a chip removing fashion. This is the case especially when a hip joint prostheses is to be replaced, in the course of which also the bone cement which is situated deep within the bone shaft has to be removed. In the past, this has been performed manually, using special tools such as chisels or scrapers. In principle it is also possible to use available. drilling or milling tools, which can be connected to small hand-held machine tools. Due to the depth of the body recesses which are to be worked on, the drilling or milling tools would have to be of such great length that a dependable chip removing machining would be impossible due to the then occurring instabilities and vibrations. This disadvantage occurs also in other applications, in which there is to be a chip removing machining of relatively deep work piece cavities.

Based on this, it is the object of the invention to develop a device for chip removing machining of the type described above, which is of simple construction and which operates with high stability and without vibrations.

In order to solve tis object, the combinations of features of claims 1 and 33 are proposed. Advantageous embodiments and further developments of the invention result from the dependent claims.

SUMMARY OF THE INVENTION

The solution according to the invention is based on the idea that there is provided a sleeve which is disposed between the shank and the cutting head and which is preferably coaxial with respect to the tool axis, which sleeve is at one end thereof rigidly and nonrotatably connected to the cutting head and carries the shank at an opposite end thereof. This results in a light tool which still is of great rigity, so that even for great tool lengths a safe and vibration-free operation is possible.

The cutting head and/or the shank may be removably connected to the sleeve by means of a screw-, snap- or bayonet-connector. It is also possible that the shank is integrally connected to the sleeve.

According to a preferred embodiment of the invention a connecting rod penetrating the sleeve in longitudinal direction, one end of which rod is adapted to be connected to the cutting head which is non-rotatably mounted at the one end of sleeve, and at the other end of which rod there is provided an axially adjustable clamping member which acts directly or indirectly over the shank on the end of the sleeve opposed to the cutting head and clamps the cutting head and which is preferably formed to be a clamping nut.

A further preferred embodiment of the invention provides that the free space in the sleeve is used as a removal channel for the chips created during the machining. To this end at least one chip entrance opening which communicates with the inside of the sleeve may be provided in the cutting head.

It is further of advantage when the sleeve comprises at least one feed channel which extends up to the cutting head and which is adapted to be subjected to a pressurized fluid which can be supplied to the work site in front of the cutting head. To this end, the connecting rod itself is preferably formed to be hollow. When the device is used for the chip-removing machining during the implantation or replacement of a prosthesis in human bone material, an antiseptic agent can be added to the fluid, so that the damage of the bone tissue or of the bone does not lead to an inflammation.

In order to improve the chip removal, the feed channel can be adapted to be subjected to a fluid which suspends chips created at the work site in a gel-like manner. A further improvement in this respect is achieved when the sleeve comprises two feed channels extending up to the cutting head, one channel being adapted to be subjected to compressed air and the other channel being adapted to be subjected to a cooling and lubricating fluid. The cooling and lubricating fluid can be vaporized at its exit point by means of the compressed air or mixed therewith in order to improve the removal of chips.

An optical waveguide leading to a viewing and for illumination means located at the cutting head can be disposed within the hollow space of the connecting rod or the sleeve, which enables a direct viewing of the work site.

In order to divide the interior space of the sleeve into further, axially continuous partial spaces, the connecting rod may comprise at least two longitudinal webs which radially protrude up to the inner surface of the sleeve Depending on the intended use, the cutting head may be formed to be a drill head, a milling head, a grindstone, a lapping stone, a reamer or a honing tool.

According to a further embodiment of the invention, the sleeve may be adapted to be connected, by way of the shank, to a suction or scavaging device. To this end, the shank comprises at least one suction or scavaging channel which communicates with the hollow space within the sleeve and/or the hollow space within the connecting rod and which is adapted to be connected to the suction or scavaging device.

In most instances it cannot be avoided that the outside of the sleeve is also washed by the cooling and lubricating fluid. In order to prevent a leakage of the cooling and lubricating fluid and of the chips through the gap between the sleeve and the bore hole, the sleeve preferably rotatably penetrates a guide ring adapted to be placed stationary on the work piece, which guide ring is sealed with respect to the work piece and/or the sleeve. In order to be able to also remove the chips from the surrounding of the sleeve with the cooling and lubricating fluid, the guide ring may comprise at least one opening which can be connected to a suction channel. The guide ring may further comprise an opening for feeding a cooling and lubricating fluid, while the space between the work piece and the sleeve communicates with a chip removal groove provided in the sleeve by means of at least one chip groove provided in the cutting head.

For working on hard to reach places it is of advantage when a flexible drive shaft is disposed between the end of the sleeve opposed to the cutting head and the shank, which flexible drive shaft may comprise feed and/or removal channels which communicate with the Inner space of the sleeve.

In order to improve the handling it is advantageous when the sleeve extends through at least one support bearing which is adapted to be anchored on the work piece or within a recess of the work piece, which comprises anchoring members which are adapted to be fixed in place on the work piece, the anchoring members being fashioned to be knobs, claws, suction cups, expanding elements, magnets, or clamping means, and which may comprise a guide bushing for the sleeve, which bushing is adapted to be pivotable transversely with respect to the axis of the sleeve. In order to be able to anchor and move the support bearing by remote control, it is of advantage when the anchoring means can be subjected to a pressure medium from the outside. A further improvement in this respect is achieved when the support bearing is connected to the sleeve such that it cannot be lost. Further, the support bearing may comprise openings for the passage of cooling and lubricating fluid and/or chips.

The drive unit according to the invention is advantageously manually guided and may comprise an electrically, hydraulically or pneumatically driven motor. The cutting head may consist at least partially of a cutting steel, a hard metal, a ceramic, or diamond, or may be coated with such a material, depending on the type and hardness of the material to be worked on.

In the following, the invention is further described with reference to the drawing, in which FIG. 1a shows a side view of a modular tool with a sleeve shank;

Figure 4:
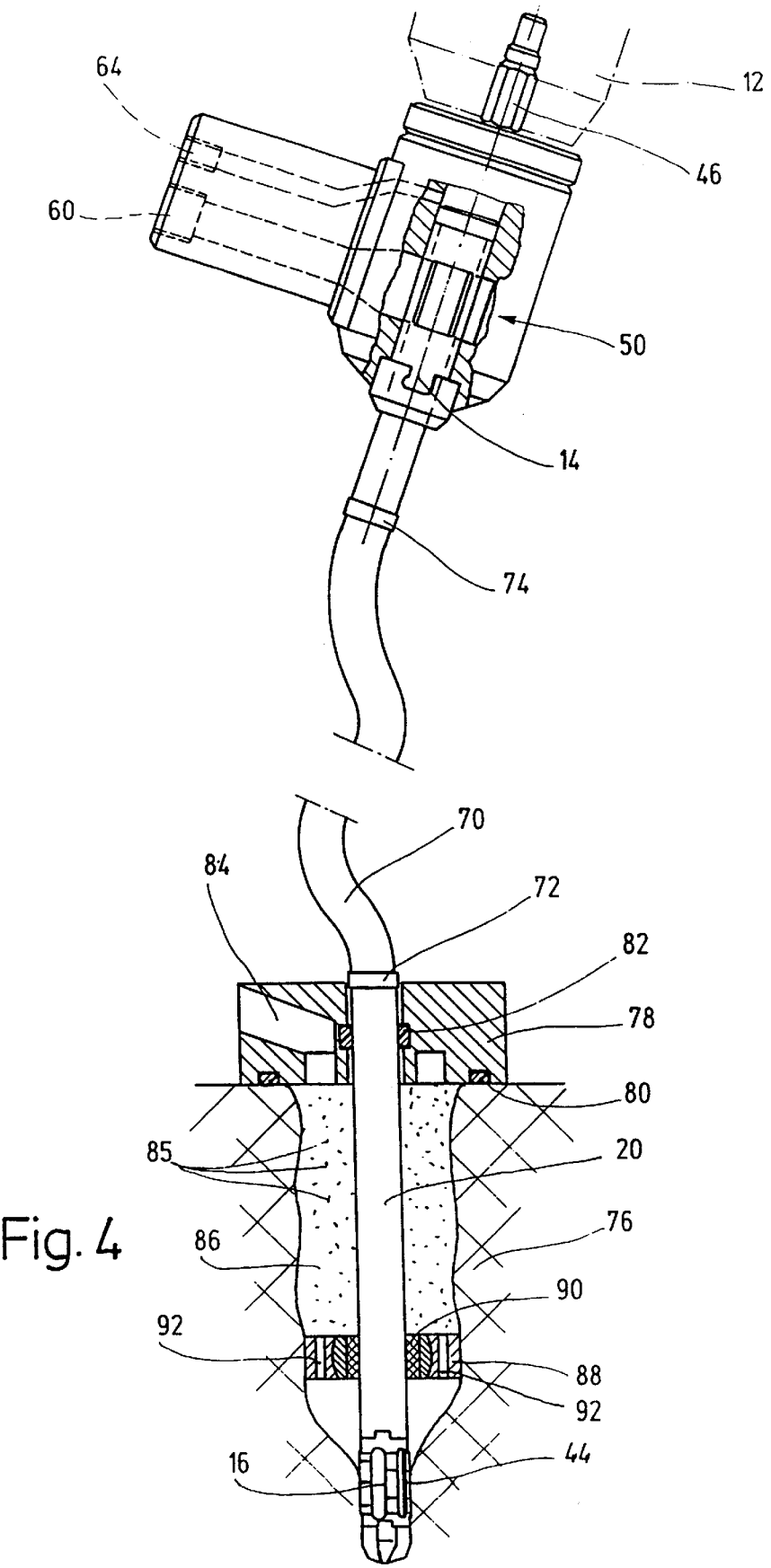

FIG. 3b and c show a section through the sleeve along the line III—III in FIG. 3a for two embodiments;

FIG. 4 shows a partially sectioned side view of the tool combined with a suction and feed device with a flexible drive shaft disposed in between the sleeve and the shank, and a support bearing adapted to be inserted into a tool recess;

FIGS. 5a to d show the support bearing according to FIG. 4 with different anchoring mechanisms in a partially sectioned view.

The devices shown in the drawing are generally intended for chip-removing machining of work piece in hard to reach places, especially in deep recesses or cavities of an object or workpiece.

DETAILED DESCRIPTION

The device consists essentially of an elongated tool 10 which rotates about Its longitudinal axis, which comprises a shank 14 adapted to be coupled to a drive unit 12 and a cutting head 16 which is disposed at an axial distance from the shank 14 and which is connected to the shank 14. In the embodiment shown in the drawing, there is provided a two-part cutting head 16, consisting of a drill head 16' and a milling head 16", which have cutting edges S and which may be joined to each other at an axial separation point 18 in a form fitting and friction fitting manner.

Figure 1:
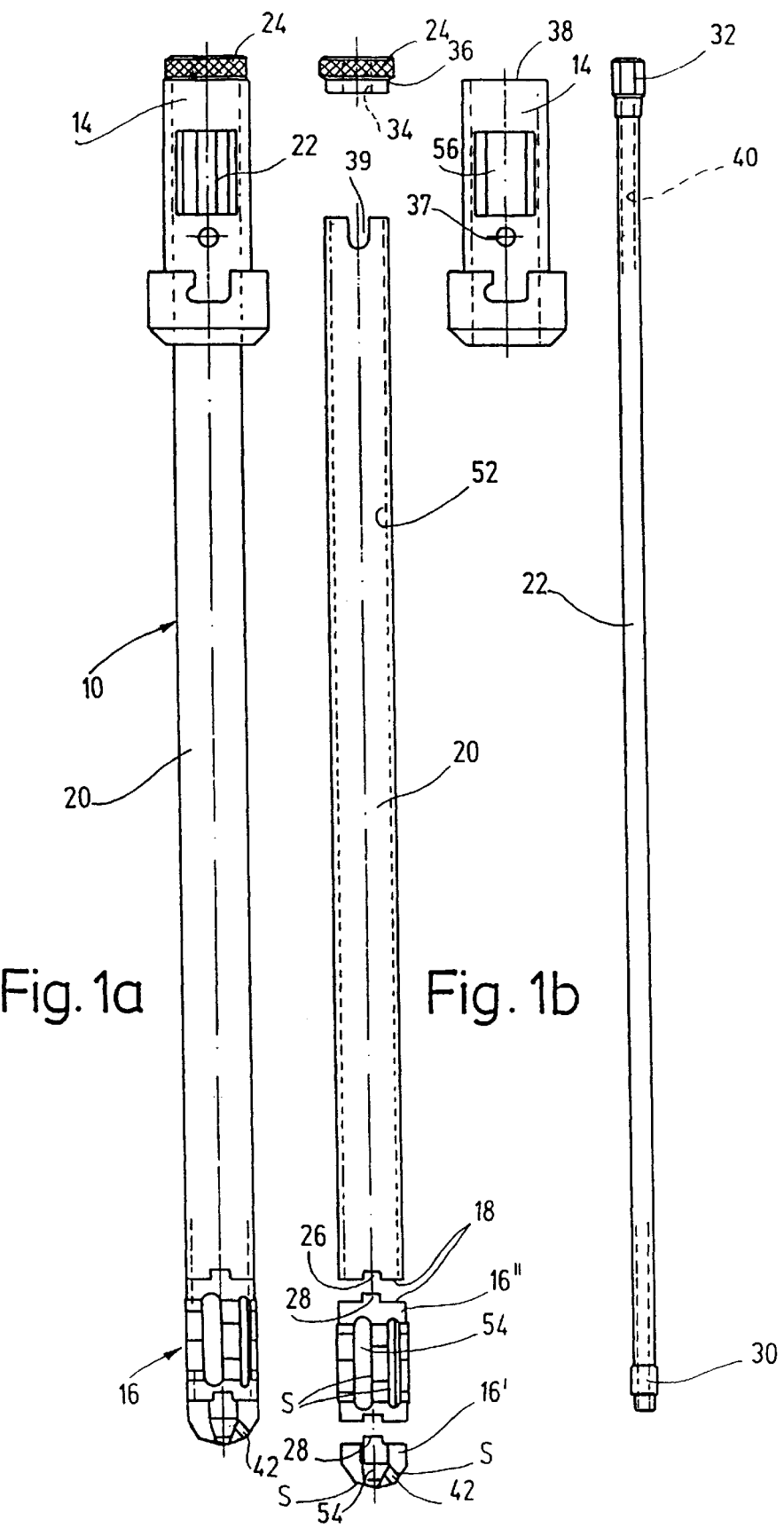
FIG. 1b shows the individual parts of the tool according to FIG. 1a in a disassembled state.

The shank 14 can be connected to the cutting head 16 by way of an elongated sleeve 20 in a form fitting and frictionally fitting manner by means of a clamping mechanism comprising a connecting rod 22 and a clamping nut 24. To this end, the sleeve 20 is provided at its in FIGS. 1a and b lower face with a number of snap recesses 26, into which the cutting head 16 engages in a form fitting manner with corresponding snap projections 28.

The connecting rod 22 is provided with an external thread 30 at its one end, with which it can be screwed into a corresponding internal thread in the drill head 16'. At the opposed end the connecting rod is provided with an external thread 32, onto which the clamping nut 24 can be screwed with its internal thread 34. The clamping nut 24 abuts with its shoulder 36 the facing edge 38 of the hollow shank 14, which in turn engages with two radially opposed bolts 37 in a form fitting manner to corresponding recesses 39 of the sleeve 20.

The tool 10 is assembled by mounting the sleeve 20 on the cutting head 16 consisting of the drill head 16' and the milling head 16" and placing the hollow shank 14 onto the other end of the sleeve 20. Next the connecting rod 22 is inserted through the shank 14 and the sleeve 20 and screwed to the cutting head 16 with Its external thread 30. Finally, the clamping nut 24 is screwed onto the thread 32 of the connecting rod 22 and tigthened with respect to the face edge 38 of the shank 14, so that the sleeve 20 and the shank 14 are clamped between the cutting head 16 and the clamping nut 24 in a frictionally fitting manner.

A one-piece cutting head may be used instead of the two-piece cutting head 16 consisting of the drill head 16' and the milling head 16" shown in the drawing, which may be formed to be a drill head, a milling head, a grindstone, a lapping stone, a reamer or a honing tool and may consist at least partially of a cutting steel, a hard metal, a ceramic, or diamond, or may be coated with such a material, depending on the type and hardness of the material to be worked on.

As can be seen especially in FIGS. 3b and c, the connecting rod 22 is best formed to be hollow. The hollow space 40 of the connecting rod 22 is advantageously formed to be a feed channel for a cooling and lubricating fluid or for compressed air, which communicates with a junction channel 42 on the working side of the drill head 16'. When a fluid is forced through the hollow space 40 of the connecting rod 22, this fluid exits tough the outlet of th junction channel 42, so that the surrounding of the work site 44 in the workpiece 76 is cooled. In a hollow cutting head 16 having cutting edges at it face or circumference, it is not necessary to provide a junction channel when the cooling and lubricating fluid can reach the cutting edges directly by way of the open end of the connecting rod 22. There may be provided a blind cover, though, which permits cooling and lubricating fluid to exit only In the region of the cutting edges.

The tool 10 described above may be damped in the chuck of hand-held drive unit 12 by means of a drive pin 46 which protrudes over the shank 14 and is formed in the embodiment shown as a multi-sided snap-pin.

Figure 2:
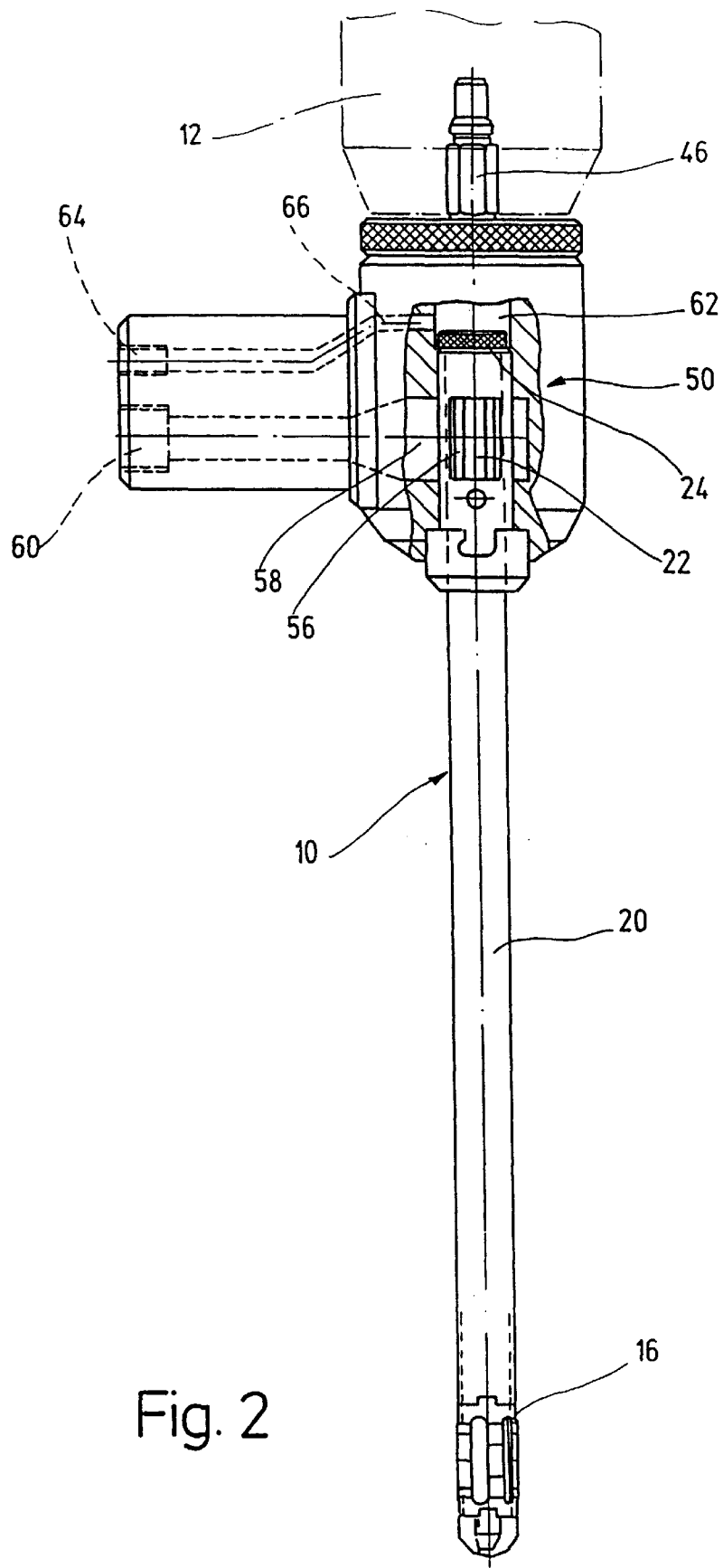
FIG. 2 shows a partially sectioned side view of the tool combined with a two channel suction and feed device.
Figure 3:
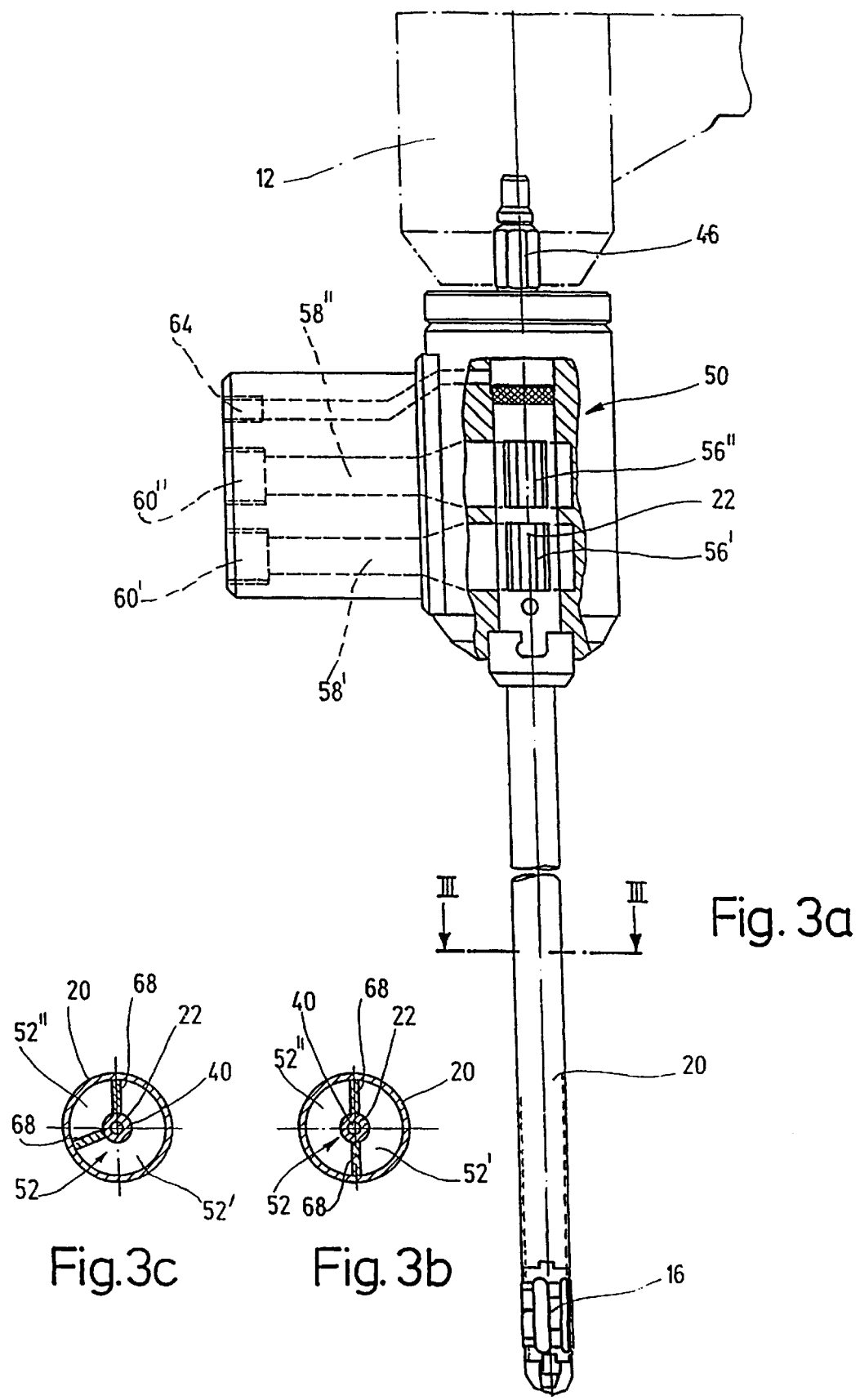
FIG. 3a shows a partially sectioned side view of the tool combined with a three channel suction and feed device.

In order to enable cooling of the work site and suctioning-off of the chips created during the machining, there is provided in the embodiments shown in FIGS. 2, 3 and 4 an additional suction and scavaging device 50, through which the tool 10 extends with its shank 14. The removal of the chips is in this case effected through the hollow space 52 of the sleeve 20, which communicates on the side of the cutting head 16 by way of the chip entrance openings 54 with the work site 44 and by way of openings 56 provided in the hollow shank 14 and a channel 58 in the suction and scavaging device 50 with a suction connection 60. The free space 62 above the clamping nut 24 communicates with the hollow space 40 of the connecting rod 22 and can be subjected to a cooling fluid by way of the scavaging connection 64 and a, scavaging channel 66. The cooling fluid reaches the work site 44 through the hollow space of the connecting rod 22.

In the embodiment shown in FIGS. 3a to c, the hollow space 52 of the sleeve 20 is divided into two partial spaces 52', 52" by means of separating walls 68, which partial spaces communicate with separate connections 60', 60" of the suction and scavaging device 50 through separate openings 56', 56" and channels 58', 58". One of the two partial spaces 52' may be used for the removal of the chips, and the other partial space 52" for feeding a fluid, for instance compressed air. The embodiment of FIG. 4 differs from the embodiments of FIGS. 2 and 3 in that a hollow flexible drive shaft 70 is aditionally disposed between the sleeve 20 and the shank 14, which makes it possible to deploy the machining device also at hard to reach work sites 44. The flexible drive shaft is removably coupled to the sleeve 20 and the shank 14 at coupling points 72, 74 in a non-rotatable and sealed manner. The chips created at the work site 44 can be removed through the sleeve 20, the hollow space of the drive shaft 70 and the shank 14 by means of the suction and scavaging device 50. Further, the flexible drive shaft 70 comprises a flexible supply duct (not shown) for supplying cooling and lubricating fluid through the scavaging connection 64 of the suction and scavaging device 50.

In the embodiment shown in FIG. 4, the sleeve 20 rotatably passes through a guide ring 78 which may be placed stationary on the workpiece 76. The guide ring is sealed with respect to the workpiece 76 as well as with respect to the sleeve 20 of the tool 10 by gaskets 80, 82. The guide ring 78 has at least one opening 84 which communicates with the work site, through which opening 84 either chips are suctioned-off or scavaging medium is supplied. With this arrangement it is for instance possible to. subject the space 86 between the workpiece 76 and the sleeve 20 to a cooling and lubricating fluid which is suctioned-off together with the chips through the sleeve 20, the hollow drive shaft 70 and the shank 14 by means of the suction and scavaging device 50.

It can be further seen from FIG. 4 that the sleeve 20 can be passed through a support bearing 88 which is disposed inside the work piece recess 86. The support bearing has a guide bushing 90 for the sleeve as well as openings 92 for the removal of chips or for supplying coolant, which bushing is pivotable transversely with respect to the sleeve axis.

As can be seen from FIGS. 5a to d, the support bearing 88 can be anchored on the workpiece 76 in various ways. As anchoring means 94 there are provided for instance knobs or suction cups, possibly with vacuum connection (FIG. 5a), claws (FIG. 5b), magnets (FIG. 5c), and clamping means (FIG. 5d).

In summary the following is to be stated: The invention is related to a device for material removing machining of objects or work pieces 76, comprising an elongated tool 10 adapted to rotate about a longitudinal axis thereof, which tool 10 comprises a shank 14 adapted to be coupled to a drive unit 12 and a cuttng head 16 connected to the shank 14. In order to be able to operate in deep work piece recesses with long tools in a stable and vibration-free manner, it is suggested according to the invention to provide a sleeve 20 extending between the shank 14 and the cutting head 16, which is at one end thereof connected to the cutting head 16 non-rotatably and non-displacably and which carries at its other end the shank 14. The tool can be clamped in the chuck of a manually guided drive unit, wherein a suction and scavaging device 50 is advantageously interposed, with which the chips created during the machining are suctioned-off through the hollow space of the sleeve 20 and coolant can be supplied to the work site 44.

We claim:

1. A device for material removing machining of objects or workpieces, comprising an elongated tool adapted to rotate about a longitudinal axis thereof, which tool comprises a shank adapted to be coupled to a drive unit, a cutting head connected to the shank and a chip removing channel extending from the cutting head to the shank and a sleeve which extends between the shank and the cutting head, which sleeve is at one end thereof rigidly and non-rotatably connected to the cutting head, wherein the sleeve carries the shank at its end which is opposed to the cutting head, and wherein a connecting rod penetrating the sleeve in longitudinal direction spares the chip removing channel, one end of the connecting rod is connected to the cutting head which is non-rotatably mounted at the one end of the sleeve, and at the other end of the connecting rod there is provided an axially adjustable clamping member which secures the connecting rod to the shank on the end of the sleeve opposed to the cutting head.

2. The device of claim 1, wherein the sleeve is disposed coaxially with respect to the longitudinal axis of the tool.

3. The device of claim 1, wherein the shank is formed to be hollow and is integrally connected to the sleeve.

4. The device of claim 1, wherein the chip removing channel is in the sleeve and the sleeve comprises at least one feed channel which is adapted to be subjected to a fluid and which extends up to the cutting head.

5. The device of claim 1, wherein the connecting rod is hollow.

6. The device of claim 5, wherein the hollow connecting rod comprises a feed channel.

7. The device of claim 4, wherein the feed channel is subjected to a fluid which suspends chips created at the work site in a gel-like manner.

8. The device of claim 4, wherein the sleeve comprises two feed channels extending up to the cutting head, one channel being adapted to be subjected to compressed air and the other channel being adapted to be subjected to a cooling and lubricating fluid.

9. The device of claim 1, wherein an optical waveguide leading to a viewing and/or illumination means located at the cutting head is disposed within a hollow space of the connecting rod or the sleeve.

10. The device of claim 1, wherein the connecting rod comprises at least two longitudinal webs which radially protrude up to an inner surface of the sleeve and which separate a space within the sleeve into at least two axially continuous sectional spaces.

11. The device of claim 1, wherein the sleeve is connected, by way of the shank, to a suction or scavaging device.

12. The device of claim 11, wherein the shank comprises at least one suction or scavaging channel which communicates with a hollow space within the sleeve or a hollow space within the connecting rod and which is connected to the suction or scavaging device.

13. The device of claim 1, wherein the cutting head is formed to be a drill head a milling head, a grindstone, a lapping stone, a reamer or a honing tool.

14. The device of claim 1, wherein the axially adjustable clamping member comprises a clamping nut and wherein the outside of the sleeve is washed with a cooling and lubricating fluid.

15. The device of claim 1, wherein the sleeve rotatably penetrates a guide ring adapted to be placed stationary on a workpiece.

16. The device of claim 15, wherein the guide ring is sealed with respect to the workpiece and the sleeve.

17. The device of claim 15, wherein the guide ring comprises at least one opening provided with a suction or feed connection.

18. The device of claim 15, wherein a space between the workpiece and the sleeve communicates with the chip removal channel provided in the sleeve by means of at least one chip groove provided in the cutting head or by means of a chip passage opening.

19. The device of claim 1, wherein the cutting head at least partially comprises a cutting steel, a hard metal, a ceramic, or diamond.

20. The device of claim 1, wherein a flexible drive shaft is disposed between the end of the sleeve opposed to the cutting head and the shank.

21. A device for material removing machining of objects or workpieces, comprising an elongated tool rotatable about a longitudinal axis thereof, which tool comprises a shank coupled to a drive unit, a cutting head connected to the shank and a chip removing groove extending from the cutting head to the shank, and a sleeve which extends between the shank and the cutting head, which sleeve is at one end thereof rigidly and non-rotatably connected to the cutting head, wherein the sleeve carries the shank at an end which is opposed to the cutting head, and wherein a flexible drive shaft is disposed between the end of the sleeve opposed to the cutting head and the shank, the flexible drive shaft including a feed or removal channel which communicates with an inner space of the sleeve.

22. The device of claim 21, wherein the drive unit is manually guided.

23. The device of claim 21, wherein the drive unit comprises an electrically, hydraulically or pneumatically driven motor.

24. The device of claim 21, wherein the sleeve extends through at least one support bearing which is within a recess of the workpiece.

25. The device of claim 24, wherein the support bearing comprises a guide bushing for the sleeve, which bushing is adapted to be pivotable transversely with respect to the axis of the sleeve.

26. The device of claim 24, wherein the support bearing comprises anchoring members which are adapted to be fixed in place on the workpiece, the anchoring members being fashioned to be knobs, claws, suction cups, expanding elements, magnets, or clamping means.

27. The device of claim 26, wherein the anchoring members are adapted to be subjected to a pressure medium.

28. The device of claim 24, wherein the support bearing is connected to the sleeve such that the bearing cannot be lost.

29. The device of claim 24, wherein the support bearing comprises openings for the passage of cooling and lubricating fluid and/or chips.

30. A device for chip-removing machining of objects, for utilizing a tool adapted to be clamped in a machine tool or a drive unit and including a cutting head or a milling head having cutting edges for removing chips during a rotation about a longitudinal tool axis, the device comprising a sleeve which is disposed coaxially with respect to the longitudinal tool axis, which sleeve is supported with one end thereof on the backside of the cutting head or the milling head, wherein there is provided a clamping device for clamping the sleeve with a connecting rod which centrally penetrates the sleeve in a longitudinal direction, one end of the connecting rod being connected to the cutting head or the milling head and at the other end of which there is disposed an adjustable clamping member which acts on the end of the sleeve opposed to the cutting head or the milling head, and wherein the connecting rod disposed in the sleeve is of such dimensions that a free space for suctioning-off the removed chips remains between an inner surface of the sleeve and the connecting rod.

31. The device of claim 30, wherein at least one longitudinal channel through the sleeve is provided for feeding a fluid to a machining side of the cutting head or the milling head.

32. The device of claim 30, wherein the connecting rod is formed to be a hollow rod including a hollow space and having fastener means at its end facing the cutting head or milling head, to which corresponding fastener means in the cutting head or the milling head are allocated, and wherein the adjustable clamping member at the other rear end of the connecting rod comprises a clamping nut.

33. The device of claim 32, wherein the clamping device comprises a clamping sleeve which is adapted to be mounted on the sleeve in a form-fitting manner and which is penetrated by the connecting rod, and wherein the clamping nut acts on a free face of the clamping sleeve.

34. The device of claim 33, wherein the clamping sleeve protrudes past the end of the sleeve which is opposed to the cutting head or the milling head and has openings there which communicate with the free space between the connecting rod and the inner surface of the sleeve, wherein the clamping nut is a hollow nut, so that the upper end of the hollow connecting rod remains open, and wherein the clamping sleeve is adapted to be mounted in a chuck of a suction and scavaging device having connectors communicating with the free space or the hollow space of the connecting rod.

* * * * *